(12) United States Patent
Bautz

(10) Patent No.: US 7,150,213 B2
(45) Date of Patent: Dec. 19, 2006

(54) VERTICAL PROCESSING CENTER

(75) Inventor: Walter Bautz, Mangoldweg 5, D-64287, Darmstadt (DE)

(73) Assignee: Walter Bautz, Darmstadt (DE)

( * ) Notice: Subject to any disclaimer, the term of this patent is extended or adjusted under 35 U.S.C. 154(b) by 47 days.

(21) Appl. No.: 10/803,096

(22) Filed: Mar. 18, 2004

(65) Prior Publication Data

US 2004/0250394 A1 Dec. 16, 2004

(30) Foreign Application Priority Data

Mar. 18, 2003 (DE) .................. 103 11 762

(51) Int. Cl.
*B23B 3/00* (2006.01)

(52) U.S. Cl. .................. 82/122; 82/125; 409/161; 409/164; 409/173; 409/221

(58) Field of Classification Search ............... 409/159, 409/160, 161, 164, 173, 198, 221; 29/33 J; 408/71; 414/224.01, 223.01
See application file for complete search history.

(56) References Cited

U.S. PATENT DOCUMENTS

| 3,825,245 | A | | 7/1974 | Osburn et al. |
| 4,090,287 | A | * | 5/1978 | Selander .................. 483/1 |
| 4,373,840 | A | * | 2/1983 | Miller, Jr. ................. 198/346.1 |
| 4,480,738 | A | * | 11/1984 | Mattson .................. 198/346.1 |
| 4,621,410 | A | * | 11/1986 | Williamson .................. 483/1 |
| 4,673,076 | A | * | 6/1987 | Mattson .................. 198/346.2 |
| 4,679,286 | A | | 7/1987 | Momoi et al. |
| 5,044,486 | A | * | 9/1991 | Kitamura .................. 198/346.1 |
| 5,212,857 | A | * | 5/1993 | McMurtry .................. 29/38 C |
| 5,257,460 | A | * | 11/1993 | McMurtry .................. 33/502 |
| 5,478,300 | A | | 12/1995 | McMurtry et al. |
| 5,637,069 | A | * | 6/1997 | Klicpera et al. .............. 483/14 |

FOREIGN PATENT DOCUMENTS

| DE | 3505138 A1 | 11/1985 |
| DE | 8603558.4 U1 | 3/1987 |
| DE | 3605470 C2 | 5/1990 |
| DE | 19607001 A1 | 8/1997 |
| DE | 19936502 C1 | 2/2001 |
| DE | 10145674 A1 | 12/2002 |
| EP | 0539837 B1 | 1/1995 |

* cited by examiner

*Primary Examiner*—Monica Carter
*Assistant Examiner*—Sara Addisu
(74) *Attorney, Agent, or Firm*—Crowell & Moring LLP

(57) ABSTRACT

A vertical machining center with a tool slide, which can be moved in a controlled manner, and a workpiece feed on one side of a machining area is designed for automatically changing the workpiece holders with workpieces. To this end, the workpiece feed is designed for holding available and accepting workpiece holders with workpieces and is mounted so as to be in alignment with a CNC rotary table on that side of the vertical machining center, on which the respective workpiece holder is held by the CNC rotary table.

12 Claims, 3 Drawing Sheets

VERTICAL PROCESSING CENTER

BACKGROUND AND SUMMARY OF THE INVENTION

This invention relates to a vertical machining center with a tool slide, which can be moved in a controlled manner, and with a workpiece feed on one side of a machining area, where to change the workpieces between the workpiece feed and the machining area there is a moveable vertical machining center component that can be controlled in at least one axis.

A vertical machining center of the aforementioned class that is designed as a lathe is the subject matter of EP 0 539 837. In the prior art vertical machining center, a gripping device is mounted on the two opposite sides of the tool slide, which can be moved in two axes. By moving the tool slide, the gripping device can take from the workpiece feed individual workpieces, feed them to a chuck of a spindle and, after machining, convey them from the chuck to a tray.

In CNC controlled vertical machining centers, in particular 3 and 4 axis vertical—running stand—machining centers, one introduces for the purpose of automatically changing the workpieces the workpiece holders, which are often designed as workpiece clamping carriers and which have several workpieces clamped in the holders, into the working area of the vertical machining center by means of suitable manipulation and transport devices and then clamps the respective workpiece holder into a rotary table that has a horizontal axis of rotation and is either CNC-controlled or is controlled, for example, by positive stops. The workpiece holders can be designed both as pallets, for example, with two clamping sides respectively or as clamping turrets. In such a design several workpieces can be machined in succession by the respective multiple machining sides in one clamping operation without interruption; and thus one avoids the individual machining of workpieces and their space and time consuming clamping and unclamping operations.

This invention is based on the problem of designing a vertical machining center of the type described above in such a manner that several workpieces can be automatically changed simultaneously between the workpiece feed and/or a workpiece carrier magazine and the working area without having to make more complex the design of the vertical machining center.

This invention solves this problem in that the workpiece feed is designed for holding available and accepting workpiece holders with workpieces and is mounted so as to be in alignment with a CNC rotary table on that side of the vertical machining center, on which the respective workpiece holder is held by the CNC rotary table.

Due to this design of the vertical machining center, merely because of a linear movement several workpieces are fed simultaneously to the vertical machining center from a delivery position of a workpiece feed on a pallet or a clamping turret as far as into its working area. Therefore, altering a vertical machining center without automatic changing of the workpieces into a vertical machining center with automatic changing of the workpieces is relatively easy, especially since the existing CNC controlled components of the vertical machining center are used anyway for the linear movement.

The workpieces can be changed especially quickly and, therefore, the changing requires only that the vertical machining center be idle for a short period of time if the workpiece feed is designed as a magazine, the movement of which can be timed and which exhibits several receivers for workpiece holders. This embodiment makes it possible to change workpiece holders in the magazine during the machining operation of the vertical machining center, so that, when the vertical machining center is idle, a desired workpiece holder can be ready immediately for takeover.

The construction of the workpiece feed is especially simple, when it has a magazine wheel, which carries the receivers and can be swiveled about a central axis.

The vertical machining center can be simplified, when, according to another improvement of the invention, the CNC rotary table can be moved on guides in the direction of the workpiece feed for the purpose of changing the workpiece holders.

In vertical machining centers, which are designed as vertical milling machines, there is often, in addition to the rotary table, a counter-vise for holding the workpiece holder on the side, facing the workpiece feed and facing away from the CNC rotary table. In such a case the invention can provide that the counter-vise is mounted at right angles to the CNC rotary table so as to be traversable with the workpiece holder out of the collision area. Then the workpiece holders can be changed merely by moving the CNC rotary table.

However, it is also possible to change the workpiece holders with the counter-vise. This is especially easy in the vertical machining center if the counter-vise has a holder for clamping the workpiece carrier, which is designed for swiveling the respective workpiece carrier 180 deg. between a position facing the CNC rotary table and a position facing the workpiece feed, and if the counter-vise is traversable on guides in the direction of the workpiece feed.

Thus, there is no need for one part of the displacing drives, including the related measuring systems of the CNC rotary table or counter-vise, because to move the CNC rotary table or the counter-vise, the tool slide and the CNC rotary table or the counter-vise have docking means. Thus, there is the possibility that the tool slide drags the CNC rotary table or the counter-vise into the desired position.

An alternative to the aforementioned embodiments can also provide that to change the workpiece holders the tool slide has a gripper 24. This gripper docks on the side of the workpiece holder, in order to convey it then by means of its three CNC controlled linear movements from the working area directly into the workpiece carrier magazine and to deposit it there, in order to subsequently remove from its magazine the next new workpiece holder, to lift it in the same manner back into the working area and to deliver it there again to the rotary table clamping device.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
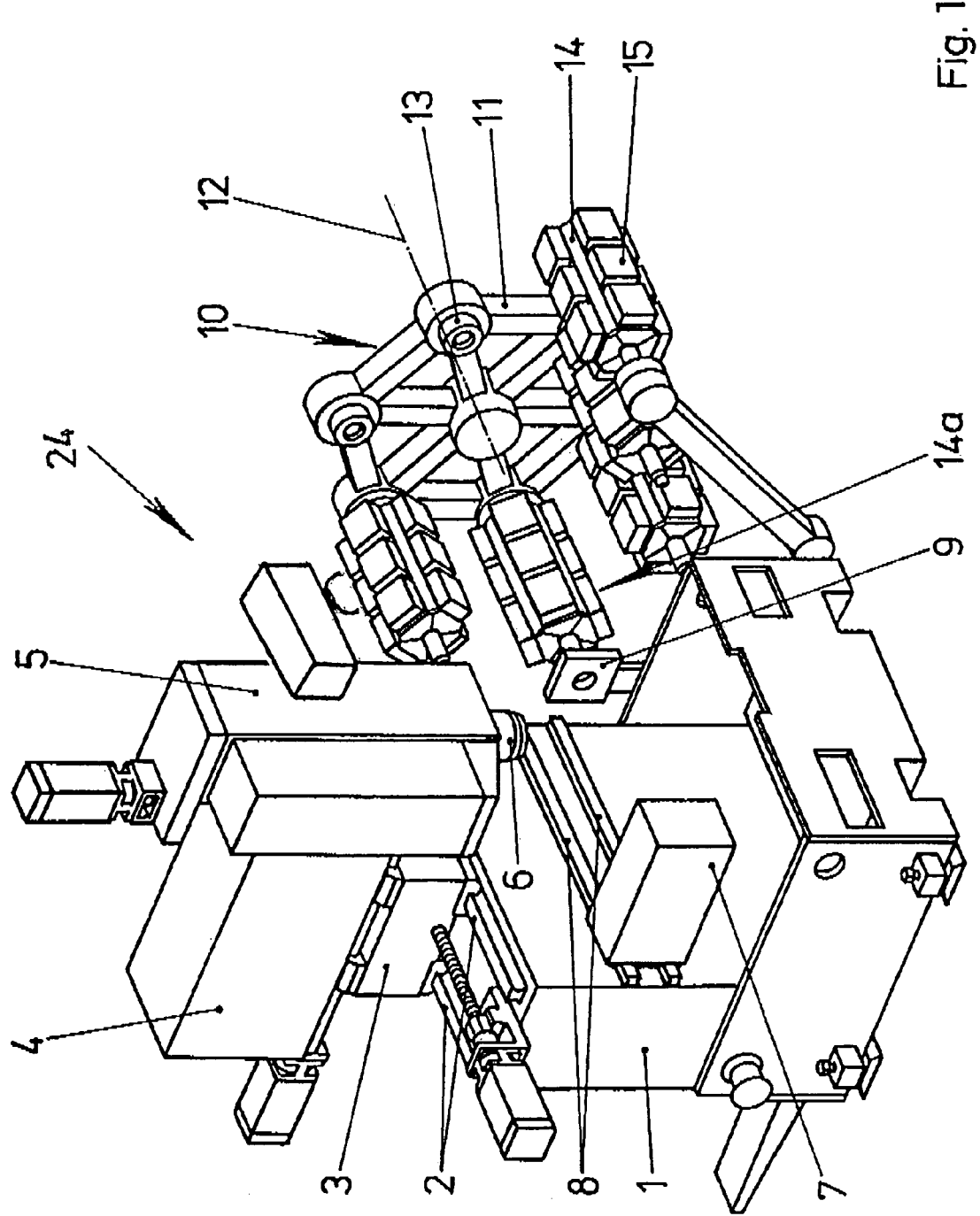
FIG. 1 is a perspective view of a vertical machining center of the invention.

FIG. 1 depicts a machine frame 1 with guides 2, on which a longitudinal slide 3 can be moved in a controlled manner. On this longitudinal slide 3 can be moved a cross slide 4, which carries a tool slide 5, which has a main spindle 6 and can be moved in the vertical direction to the cross slide.

Furthermore, the vertical machining center has a CNC rotary table 7, which is shown only as a block and which can be moved on guides 8, running parallel to the guides 2. On the right side of the machine frame 1 one can see a counter-vise 9, which is in alignment with the CNC rotary table 7. Also on the right side of the machine frame 1 one can see a workpiece feed 10, designed as a workpiece magazine. This workpiece feed has a magazine wheel 11, which can be swiveled about an axis 12 and has receivers 13 for workpiece holders 14. These workpiece holders 14 carry workpieces 15 and could be called, therefore, multiparts-workpiece clamping carriers.

To load the vertical machining center with a workpiece holder 14a, the counter-vise 9 moves first to the front or the bottom. Then the CNC rotary table 7 moves in the direction of the workpiece holder 14a and accepts that end of the workpiece holder 14a that faces it. Then the CNC rotary table 7 returns with the workpiece holder 14a to the left until the counter-vise 9 moves again into its designated position and can accept the other end of the workpiece holder 14a. The CNC rotary table 7 can move by means of its own drive, which is not shown. However, it is also possible to displace it by means of the tool slide 5. The counter-vise 9 can be moved, for example, by means of a hydraulic cylinder, which is also not shown.

Figure 2:
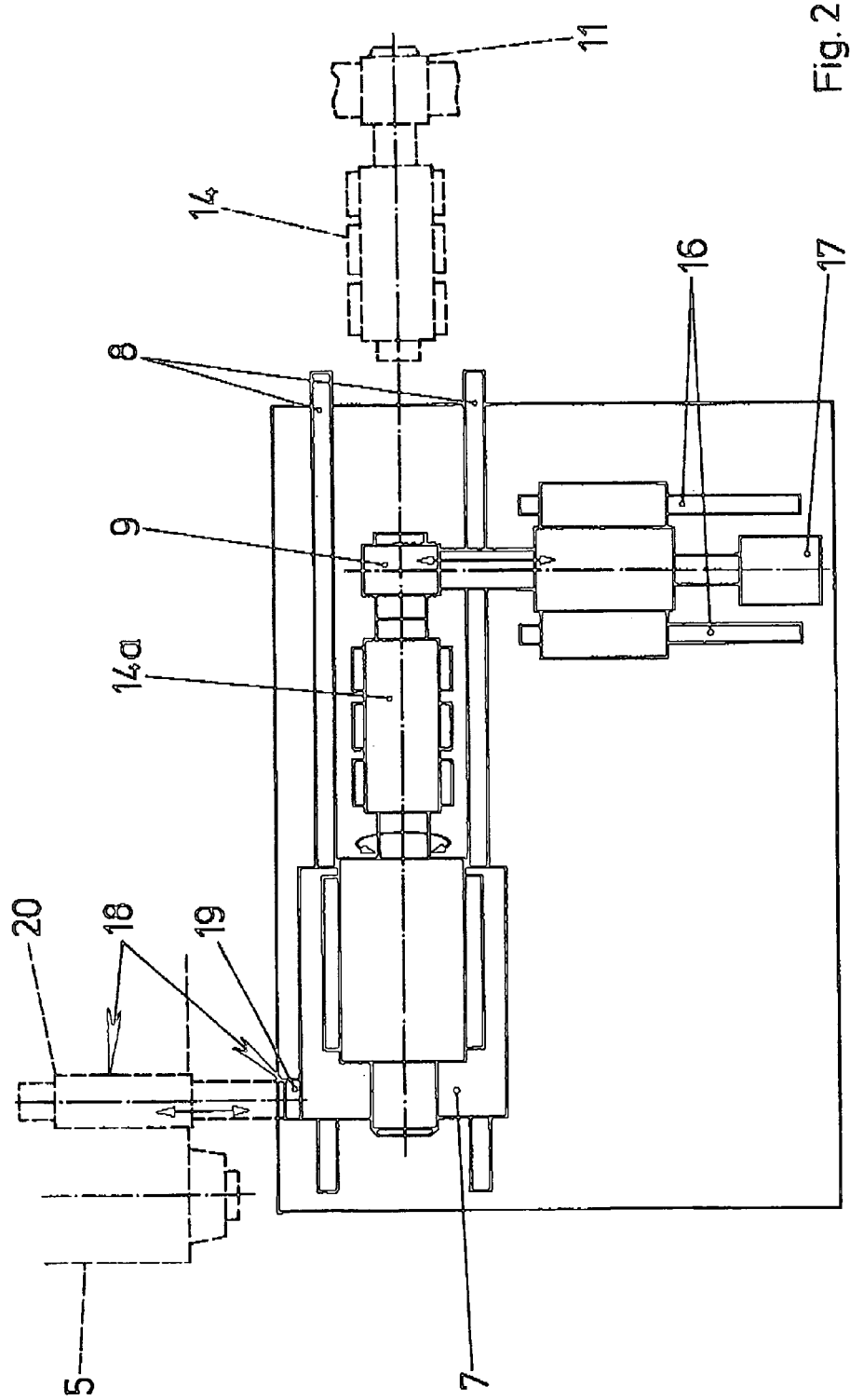
FIG. 2 is a schematic drawing of the vertical machining center.

FIG. 2 shows a workpiece holder 14a in the machining position. In this position it is held by the CNC rotary table 7 and the counter-vise 9. One can also see in FIG. 2 the guides 8, on which the CNC rotary table 7 can be moved. Furthermore, FIG. 2 shows rails 16, oriented at right angles to the rotary table and by which the counter-vise 9 can be moved at right angles to the travel of the CNC rotary table 7. In the position, shown in FIG. 2, the CNC rotary table 7 is connected to the tool slide 5 by means of docking means 18. Thus the CNC rotary table 7 can be moved on the guides 8 by means of the tool slide 5. The docking means 18 consist of a coupling element 19 on the CNC rotary table and a ram 20 on the tool slide 5.

Figure 3:
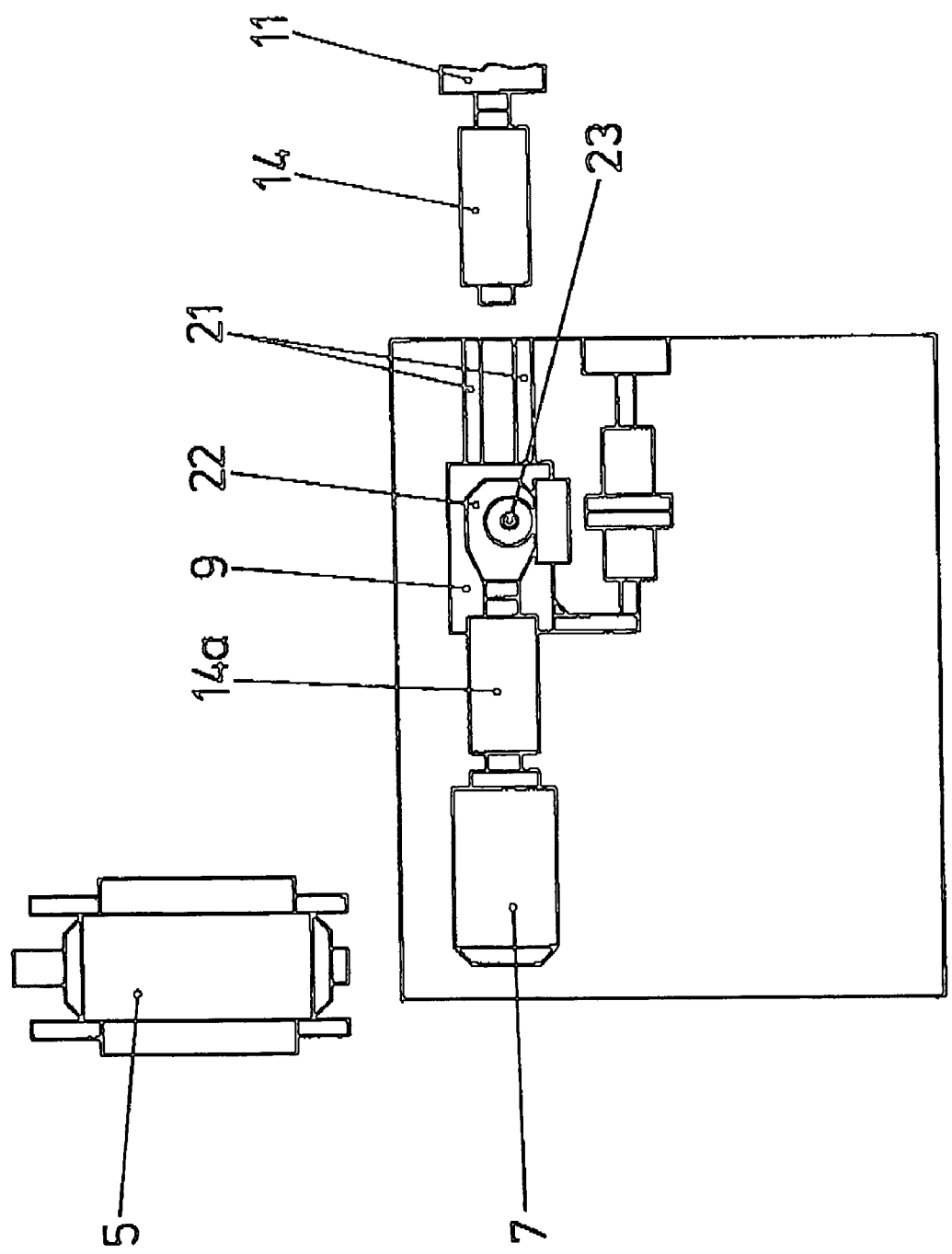
FIG. 3 is a basic schematic of a second embodiment of the vertical machining center.

In the embodiment, according to FIG. 3, the CNC rotary table 7 is mounted immovably. However, the counter-vise 9 can be moved, instead, on guides 21 in the direction of the magazine wheel 11. In this embodiment the counter-vise 9 has a holder 22, which can be swiveled 180° about an axis 23 running perpendicularly to the guides 21. Thus, a workpiece holder 14a can be swiveled out of the position, facing the CNC rotary table 7, into a position facing the magazine wheel 11, in order to deposit the workpiece holder 14a by moving the counter-vise 9 on the guides 21 into the magazine wheel 11. Correspondingly a new workpiece holder 14 can be removed from the magazine wheel 11 and inserted into the CNC rotary table 7.

It is not shown that the workpiece feed 10 can be upstream of a separate retrofitting and multipart loading and unloading station, which can take the individual workpiece holders from the workpiece feed as a function of time in parallel to the machining semi or totally automatically in succession, in order to load there with new raw parts, to retrofit with new parts or to exchange the workpiece holder for a different one and to feed it then again in the same manner to the workpiece feed.

This application claims the priority of German patent application No. 103 11 762.8, filed Mar. 18, 2003, the disclosure of which is expressly incorporated by reference herein.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vertical machining center, comprising:
   a tool slide which can be moved in a controlled manner;
   a workpiece feed on one side of a machining area;
   a moveable vertical machining center component that can be controlled in at least one axis to change workpieces between the workpiece feed and the machining area;
   said workpiece feed being adapted to hold available and accent workpiece holders with workpieces and being mounted so as to be in alignment with a CNC rotary table on that side of the vertical machining center, on which the respective workpiece holder is held by the CNC rotary table, and wherein the CNC rotary table is movable on guides in a direction of the workpiece feed such that the CNC rotary table is directly contactable with the workpiece holders to change the workpiece holders; and
   a counter-vise to hold the workpiece holder on the side, facing the workpiece feed and facing away from the CNC rotary table, said counter-vise being mounted so as to be traversable with the workpiece holder out of the collision area.

2. A vertical machining center, as claimed in claim 1, wherein the workpiece feed comprises a magazine, the movement of which can be timed and which has a plurality of receivers for workpiece holders.

3. A vertical machining center, as claimed in claim 2, wherein the workpiece feed comprises a magazine wheel which carries the receivers and can be swiveled about a central axis.

4. A vertical machining center, as claimed in claim 1, wherein to move the CNC rotary table or the counter-vise, the tool slide and the CNC rotary table or the counter-vise have docking means.

5. A vertical machining center, comprising:
   a tool slide which can be moved in a controlled manner;
   a workpiece feed on one side of a machining area;
   a moveable vertical machining center component that can be controlled in at least one axis to change workpieces between the workpiece feed and the machining area;
   said workpiece feed being adapted to hold available and accent workpiece holders with workpieces and being mounted so as to be in alignment with a CNC rotary table on that side of the vertical machining center, on which the respective workpiece holder is held by the CNC rotary table; and
   a counter-vise that includes a holder for clamping the workpiece holder, which is designed for swiveling the respective workpiece holder 180° between a position facing the CNC rotary table and a position facing the workpiece feed, and the counter-vise is traversable on guides in the direction of the workpiece feed.

6. A vertical machining center, as claimed in claim 5, wherein the workpiece feed comprises a magazine, the movement of which can be timed and which has a plurality of receivers for workpiece holders.

7. A vertical machining center, as claimed in claim 6, wherein the workpiece feed comprises a magazine wheel which carries the receivers and can be swiveled about a central axis.

8. A vertical machining center, as claimed in claim 5, wherein to move the CNC rotary table or the counter-vise, the tool slide and the CNC rotary table or the counter-vise have docking means.

9. A vertical machining center, comprising:
- a tool slide which can be moved in a controlled manner;
- a workpiece feed on one side of a machining area;
- a moveable vertical machining center component that can be controlled in at least one axis to change workpieces between the workpiece feed and the machining area;
- said workpiece feed being adapted to hold available and accent workpiece holders with workpieces and being mounted so as to be in alignment with a CNC rotary table on that side of the vertical machining center, on which the respective workpiece holder is held by the CNC rotary table; and
- wherein the tool slide has a gripper to change the workpiece holders.

10. A vertical machining center, as claimed in claim 9, wherein the workpiece feed comprises a magazine, the movement of which can be timed and which has a plurality of receivers for workpiece holders.

11. A vertical machining center, as claimed in claim 10, wherein the workpiece feed comprises a magazine wheel which carries the receivers and can be swiveled about a central axis.

12. A vertical machining center, as claimed in claim 9, wherein to move the CNC rotary table or a counter-vise, the tool slide and the CNC rotary table or the counter-vise have docking means.

* * * * *